US010846249B2

(12) United States Patent
Hegarty et al.

(10) Patent No.: US 10,846,249 B2
(45) Date of Patent: Nov. 24, 2020

(54) BI-DIRECTIONAL ASYNCHRONOUS I/O ABSTRACTION BASED UPON PAIR OF TIGHTLY COUPLED REACTIVE STREAMS FLOWS

(71) Applicant: Oracle International Corporation, Redwood Shores, CA (US)

(72) Inventors: Chris Hegarty, Dublin (IE); Daniel Jean-Michel Fuchs, Dublin (IE); Michael Conor McMahon, Dublin (IE); Pavel Rappo, Dun Laoghaire (IE)

(73) Assignee: Oracle International Corporation, Redwood Shores, CA (US)

( * ) Notice: Subject to any disclaimer, the term of this patent is extended or adjusted under 35 U.S.C. 154(b) by 64 days.

(21) Appl. No.: 16/165,809

(22) Filed: Oct. 19, 2018

(65) Prior Publication Data
US 2020/0125509 A1    Apr. 23, 2020

(51) Int. Cl.
*G06F 13/20*    (2006.01)
*H04L 29/06*    (2006.01)

(52) U.S. Cl.
CPC .............. *G06F 13/20* (2013.01); *H04L 65/60* (2013.01); *G06F 2213/3604* (2013.01)

(58) Field of Classification Search
CPC ................................ G06F 13/20; H04L 65/60
USPC ................. 710/31, 16, 20, 33; 709/217, 219
See application file for complete search history.

(56) References Cited

U.S. PATENT DOCUMENTS

| 2003/0086426 | A1* | 5/2003 | Vandeweerd | G06F 30/33 370/394 |
| 2010/0042999 | A1* | 2/2010 | Dorai | G06F 9/466 718/101 |
| 2010/0166063 | A1* | 7/2010 | Perlman | H04N 21/2662 375/240.07 |
| 2012/0079066 | A1* | 3/2012 | Li | H04L 67/26 709/217 |
| 2012/0191802 | A1* | 7/2012 | Rodrigues | H04L 67/06 709/217 |
| 2015/0381679 | A1* | 12/2015 | De Smet | H04L 65/60 709/219 |

OTHER PUBLICATIONS

OnError(Throwable) vs cancel() #271. Github forum. Jun. 4, 2015. Found at https://github.com/reactive-streams/reactive-streams-jvm/issues/271. (Year: 2015).*

* cited by examiner

*Primary Examiner* — Farley Abad
*Assistant Examiner* — Henry W Yu
(74) *Attorney, Agent, or Firm* — Invoke (57) ABSTRACT

Systems and methods are provided based on tightly coupled RS flows to provide bi-directional asynchronous stream processing with non-blocking back pressure. Signal, data, and error processing may be performed and routing of signals, data, and error information between multiple RS flows may be performed according to detected conditions.

20 Claims, 7 Drawing Sheets

BI-DIRECTIONAL ASYNCHRONOUS I/O ABSTRACTION BASED UPON PAIR OF TIGHTLY COUPLED REACTIVE STREAMS FLOWS

TECHNICAL FIELD

The present disclosure relates to tightly coupled Reactive Streams (RS). In particular, the present disclosure relates to a bi-directional asynchronous I/O abstraction based upon a pair of tightly coupled RS flows.

BACKGROUND

Reactive Streams (RS) is a computer-language-agnostic and computer-platform-agnostic specification of a standard for low-level uni-directional asynchronous communications streams with non-blocking back pressure. A single RS uni-directional flow includes a Publisher that transmits data and a Subscriber that receives the data across a link between the Publisher and the Subscriber. In the RS flows, signals and data may pass from the Publisher to the Subscriber across the link. A RS flow does not interact with any other RS flow—.

The approaches described in this section are approaches that could be pursued, but not necessarily approaches that have been previously conceived or pursued. Therefore, unless otherwise indicated, one should not assume that any of the approaches described in this section qualify as prior art merely by virtue of being included in this section.

BRIEF DESCRIPTION OF THE DRAWINGS

The embodiments are illustrated by way of example and not by way of limitation in the figures of the accompanying drawings. One should note that references to "an" or "one" embodiment in this disclosure are not necessarily to the same embodiment, and the references to "an" or "one" embodiment mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Systems and methods are provided based on tightly coupled Reactive Streams (RS) flows to provide bi-directional asynchronous stream processing with non-blocking back pressure. Signal, data, and error processing may be performed and routing of signals, data, and error information between multiple RS flows may be performed according to detected conditions.

Various embodiments include a component having a computing processor that tightly couples RS flows to provide bi-directional asynchronous communications. The computing processor may be operative to digitally communicate information via the RS flows. The component performs operations including executing a first subscriber of a first uni-directional reactive stream and executing a second publisher of a second uni-directional reactive stream. The first uni-directional reactive stream is used to receive data by the first component from a second component, and the second uni-directional reactive stream is used to transmit at least (a) non-error data associated with the second uni-directional reactive stream by the first component to the second component and (b) messages associated with the first uni-directional reactive stream. The first component also receives, by the first subscriber of the first uni-directional reactive stream from the first publisher of the first uni-directional reactive stream, a first set of subscribed data. The first component also determines if there is a need to communicate information responsive to a condition of the first uni-directional reactive stream back to the second component even though the first uni-directional reactive stream is directed from the first publisher to the first subscriber. If the first component determines that there is a need to communicate the information, the first component publishes the information corresponding to the condition of the first uni-directional reactive stream, by the second publisher of the second uni-directional reactive stream, to the second subscriber of the second uni-directional reactive stream.

Various embodiments include a component having a computing processor that tightly couples RS flows to provide bi-directional asynchronous communications. The component performs operations including executing a first subscriber of a first uni-directional reactive stream and executing a second publisher of a second uni-directional reactive stream. The first uni-directional reactive stream is used to receive data by the first component from a second component, and the second uni-directional reactive stream is used to transmit at least (a) non-error data associated with the second uni-directional reactive stream by the first component to the second component and (b) instructions associated with the first uni-directional reactive stream. The first component also receives, by the first subscriber of the first uni-directional reactive stream from the first publisher of the first uni-directional reactive stream, a first set of subscribed data. Prior to publishing, by a third publisher of a third uni-directional reactive stream, the first set of subscribed data, the first component also publishes instructions associated with the first set of subscribed data by the second publisher of the second uni-directional reactive stream to the second subscriber of the second uni-directional reactive stream.

One or more embodiments described in this Specification and/or recited in the claims may not be included in this General Overview section.

2. Architectural Overview

The RS specification provides a low-level set of concepts and abstractions that support a standard for asynchronous stream processing with non-blocking back pressure. The basic interface can be described as follows:

```
Publisher<T> {
    subscribe(Subscriber<T>)
}
Subscription {
    request(long)
    cancel( )
}
Subscriber<T> {
    onSubscribe(Subscription)
    onNext(T)
    onError(Throwable)
    onComplete( )
}
```

A Publisher may produce items. A Subscriber may be subscribed to a Publisher using the Publisher's subscribe method in order to receive the items that the Publisher produces. A Publisher/Subscriber pair represents a single unidirectional stream. During the subscribe process, the Publisher's implementation of the subscribe method may create a new Subscription and pass the Subscription to the Subscriber through the Subscriber's onSubscribe method. The Subscription object may form a link between the Publisher and Subscriber over which signals and data may pass between the Subscriber to the Publisher. The Subscriber may invoke the Subscription's request method to receive more items, thereby signaling the number of items that the Subscriber wishes to receive from the Publisher. A Subscriber may call the Subscription's cancel method to stop receiving items.

Since the Subscriber is subscribed directly to the Publisher, this subscription forms a link between the Publisher and the Subscriber over which signals and data may pass between the Publisher and the Subscriber. If the Publisher has a demand from the Subscriber, then the Publisher may pass an item to the Subscriber through the Subscriber's onNext method. If the Publisher encounters an error, or otherwise has a problem, then the Publisher may invoke the Subscriber's onError method. If the Publisher has no more items, and will not publish any more items, then the Publisher may invoke the Subscriber's onComplete method.

The flow of items and data occurs through the onNext method invocations. Metadata such as the Subscription and an error may be passed through a single invocation of onSubscribe and onError, respectively. The onComplete is a signal method, carrying no other information.

Only signals, e.g., request and cancel signals, may be sent from the Subscriber to the Publisher, through the Subscription. Errors may be sent from Publisher to the Subscriber, but not in the other direction. A bi-directional flow can be built from two unidirectional Reactive Stream flows.

Figure 1:
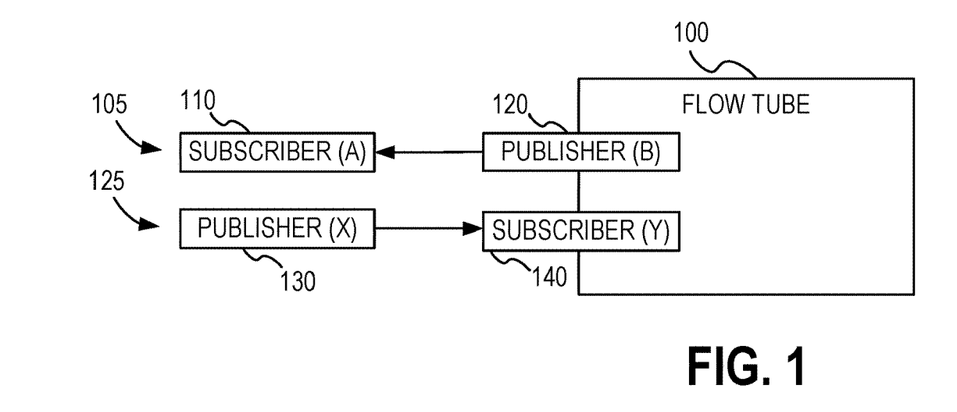
FIG. 1 is a block diagram that illustrates a one-sided flowtube for tightly coupling a pair of RS flows, in accordance with one or more embodiments.

FIG. 1 is a block diagram that illustrates a one-sided flowtube 100 for tightly coupling a Reactive Stream 105 and a Reactive Stream 125, in accordance with one or more embodiments. The Reactive Stream 105 includes Publisher (B) 120 source that is part of the flowtube 100. The flowtube 100 may be part of a first component. The Publisher(B) 120 is subscribed to by the Subscriber(A) 110 sink. The Subscriber(A) 110 may be part of a second component separate from and/or external to the first component that includes the flowtube 100. Data and/or signals flow from the Publisher (B) 120 to the Subscriber(A) 110 according to the RS protocol in the Reactive Stream 105. The Reactive Stream 125 includes Publisher(X) 130 source that may be part of the second component. The Publisher(X) 130 is subscribed to by the Subscriber(Y) 140 sink. The Subscriber(Y) 140 is part of the flowtube 100. Data and/or signals flow from the Publisher(X) 130 to the Subscriber(Y) 140 according to the RS protocol in the Reactive Stream 125. The pair of RS 105 and 125 may provide asynchronous stream processing, with non-blocking back pressure, in a bi-directional flow.

By tightly coupling the Reactive Stream 105 and Reactive Stream 125 in the flowtube 100, a more intimate relationship between the Reactive Stream 105 and the Reactive Stream 125 may be provided than in prior RS. The flowtube 100 may utilize the Reactive Stream protocols to cause data and/or signals sent on one of the RS 105 or 125 to be rerouted and then sent on the other of the RS 105 or 125 according to one or more conditions. The flowtube 100 may utilize the Reactive Stream protocols to cause errors to flow between the RS 105 or 125 rather than be transmitted out of band. The flowtube 100 may utilize the Reactive Stream protocols to cause data and/or errors to be injected into one of the RS 105 or 125 to flow in one direction or the other.

In a component performing bi-directional asynchronous communications based upon a pair of RS flows, where one RS flow is used for reading and one RS flow is used for writing, the component may not have a natural place to report errors that occur in the component's writing side within the RS flow in real time. These writing side errors may typically be logged in a file or reported out of band. The flowtube 100 facilitates the errors that occur in the Subscriber on the writing side, for example, to be routed from the flow in which they occur to the other Reactive Stream flow in the opposite direction within the flowtube 100. Thus, routing of error within a Reactive Stream flow is performed within Reactive Stream flows. For example, if an error occurs in the Subscriber(Y) 140 in the Reactive Stream 125, the flowtube 100 may route the error to the Reactive Stream 105 and publish the error via the Publisher(B) 120 to the Subscriber(A) 110. In this way, a component associated with the Publisher(X) 130 and the Subscriber(A) 110 may receive notice of the error condition of the Subscriber(Y) 140 that occurred in the Reactive Stream 125 promptly via the Reactive Stream 105. This routing of errors via the tight coupling of RS by the flowtube 100 also facilitates robust error handling on one side of the RS flows or a chain of RS flows. By handling errors on one side of the RS flows, logic of error handling may be simplified resulting in more robust and succinct error handling program code.

In the illustrated example of FIG. 1, all errors in the RS 105 and 125 may be delivered, regardless of their origin, through the Publisher(B) 120 to the ultimate Subscriber(A) 110. These errors may include errors notified to Subscriber (Y) 140 from Publisher(X) 130 as well as other errors originating from within the flowtube 100.

Figure 2:
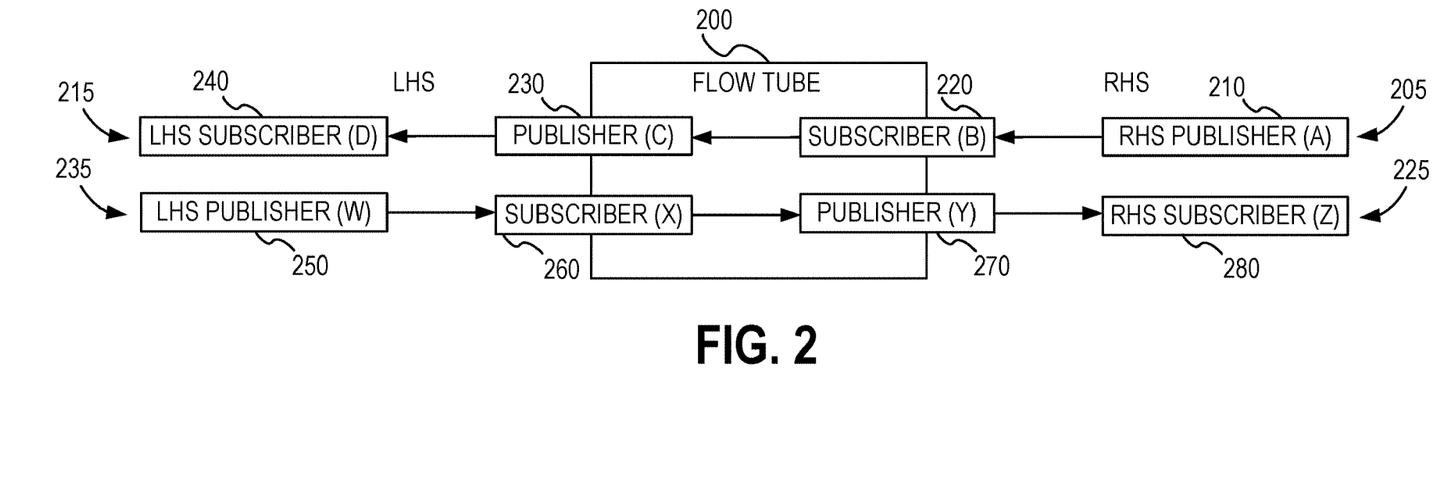
FIG. 2 is a block diagram that illustrates a two-sided flowtube for tightly coupling a set of RS flows, in accordance with one or more embodiments.

FIG. 2 is a block diagram that illustrates a two-sided flowtube 200 for tightly coupling a Reactive Stream 205, a Reactive Stream 215, a Reactive Stream 235, and a Reactive Stream 225, in accordance with one or more embodiments. In an embodiment, the flowtube 200 provides a tightly coupled chain between a left-hand side (LHS) pair of RS 215 and 235 and a right-hand side (RHS) pair of RS 205 and 225.

The Reactive Stream 205 includes RHS Publisher(A) 210 source that may be part of a RHS component separate from and/or external to a component that includes the flowtube 200. The RHS Publisher(A) 210 is subscribed to by the Subscriber(B) 220 sink. The Subscriber(B) 220 is part of the component that includes the flowtube 200. Data and/or signals flow from the RHS Publisher(A) 210 to the Subscriber(B) 220 according to the RS protocol in the Reactive Stream 205.

The Reactive Stream 215 includes a Publisher(C) 230 source that is part of the component that includes the flowtube 200. The Publisher(C) 230 is subscribed to by the LHS Subscriber(D) 240 sink. The LHS Subscriber(D) 240 may be part of a LHS component separate from and/or external to the component that includes the flowtube 200. Data and/or signals flow from the Publisher(C) 230 to the LHS Subscriber(D) 240 according to the RS protocol in the Reactive Stream 215. The chain of RS 205 and 215 may provide a single uni-directional path through the flowtube 200 when the flowtube 200 is configured to forward data and/or signals from the Subscriber(B) 220 to the Publisher (C) 230.

The Reactive Stream 235 includes LHS Publisher(W) 250 source that may be part of a LHS component separate from and/or external to a component that includes the flowtube 200. The LHS Publisher(W) 250 is subscribed to by the Subscriber(X) 260 sink. The Subscriber(X) 260 is part of the component that includes the flowtube 200. Data and/or signals flow from the LHS Publisher(W) 250 to the Subscriber(X) 260 according to the RS protocol in the Reactive Stream 235.

The Reactive Stream 225 includes a Publisher(Y) 270 source that is part of the component that includes the flowtube 200. The Publisher(Y) 270 is subscribed to by the RHS Subscriber(Z) 280 sink. The RHS Subscriber(Z) 280 may be part of a RHS component separate from and/or external to the component that includes the flowtube 200. Data and/or signals flow from the Publisher(Y) 270 to the RHS Subscriber(Z) 280 according to the RS protocol in the Reactive Stream 225. The chain of RS 235 and 225 may provide a single uni-directional path through the flowtube 200 when the flowtube 200 is configured to forward data and/or signals from the Subscriber(X) 260 to the Publisher (Y) 270.

In a manner similar to that described with reference to FIG. 1, the flowtube 200 may utilize the Reactive Stream protocols to cause data and/or signals sent on one of the RS 205, 215, 225, or 235 to be rerouted and then sent on any other of the RS 205, 215, 225, or 235 according to one or more conditions. The flowtube 200 may utilize the Reactive Stream protocols to cause errors to flow between the RS 205, 215, 225, or 235 rather than be transmitted out of band. The flowtube 200 may utilize the Reactive Stream protocols to cause data and/or errors to be injected into one of the RS 205, 215, 225, or 235 to flow in one direction or the other. For example, an error occurring in Subscriber(X) 260 may be rerouted by the flowtube 200 through the Publisher(C) 230 to the ultimate LHS Subscriber(D) 240. These errors may include errors notified to Subscriber(X) 260 from LHS Publisher(W) 250 as well as other errors originating from within the flowtube 200. Likewise, an error occurring in Subscriber(B) 220 may be rerouted by the flowtube 200 through the Publisher(Y) 270 to the ultimate RHS Subscriber(Z) 280. These errors may include errors notified to Subscriber(B) 220 from RHS Publisher(A) 210 as well as other errors originating from within the flowtube 200.

Figure 3:
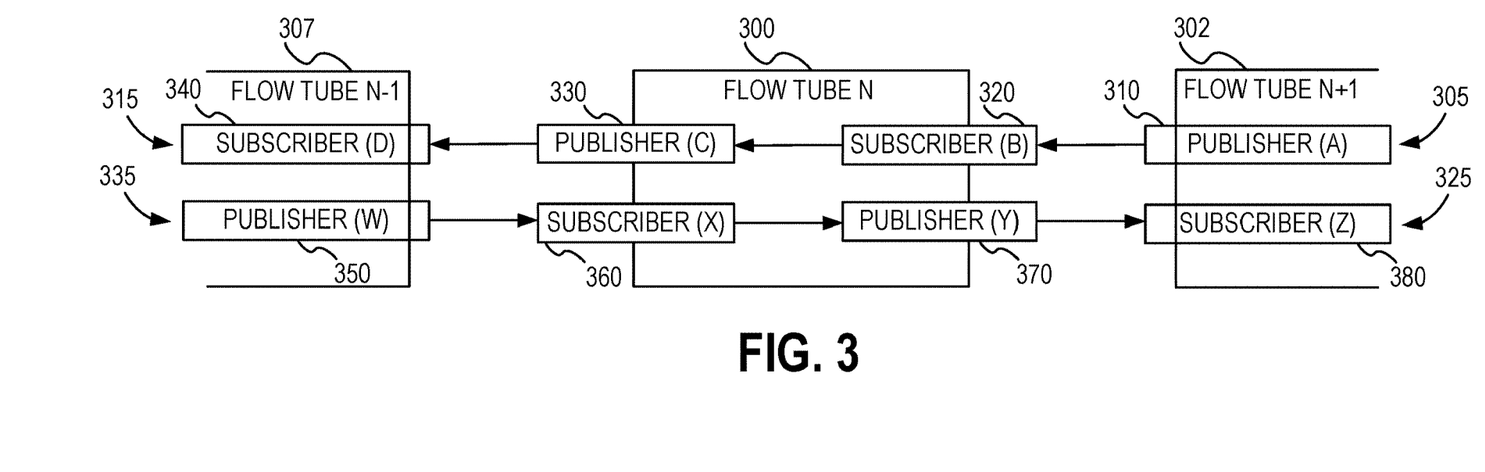
FIG. 3 is a block diagram that illustrates a two-sided flowtube N that is linked with a flowtube N+1 and a flowtube N−1 to form a chain of flowtubes, in accordance with one or more embodiments.

FIG. 3 is a block diagram that illustrates a two-sided flowtube N 300 that is linked with a flowtube N+1 302 and a flowtube N−1 307 to form a chain of flowtubes, in accordance with one or more embodiments. Chains of flowtubes are useful to facilitate additional processing of data and signals that flow through the flowtubes from one side of the chain to the other.

The Reactive Stream 305 includes Publisher(A) 310 source that may be part of a component that includes the flowtube N+1 302. The Publisher(A) 310 is subscribed to by the Subscriber(B) 320 sink. The Subscriber(B) 320 is part of the component that includes the flowtube N 300. Data and/or signals flow from the Publisher(A) 310 to the Subscriber(B) 320 according to the RS protocol in the Reactive Stream 305.

The Reactive Stream 315 includes a Publisher(C) 330 source that is part of the component that includes the flowtube N 300. The Publisher(C) 330 is subscribed to by the Subscriber(D) 340 sink. The Subscriber(D) 340 may be part of a component that includes the flowtube N−1 307. Data and/or signals flow from the Publisher(C) 330 to the Subscriber(D) 340 according to the RS protocol in the Reactive Stream 315. The chain of RS 305 and 315 may provide a single uni-directional path from the flowtube N+1 302 through the flowtube N 300 to the flowtube N−1 307 when the flowtube N 300 is configured to forward data and/or signals from the Subscriber(B) 320 to the Publisher (C) 330.

The Reactive Stream 335 includes Publisher(W) 350 source that may be part of a component that includes the flowtube N−1 307. The Publisher(W) 350 is subscribed to by the Subscriber(X) 360 sink. The Subscriber(X) 360 is part of the component that includes the flowtube N 300. Data and/or signals flow from the Publisher(W) 350 to the Subscriber(X) 360 according to the RS protocol in the Reactive Stream 335.

The Reactive Stream 325 includes a Publisher(Y) 370 source that is part of the component that includes the flowtube N 300. The Publisher(Y) 370 is subscribed to by the Subscriber(Z) 380 sink. The Subscriber(Z) 380 may be part of the component that includes the flowtube N+1 302. Data and/or signals flow from the Publisher(Y) 370 to the Subscriber(Z) 380 according to the RS protocol in the Reactive Stream 325. The chain of RS 335 and 325 may provide a single uni-directional path from the flowtube N−1 307 through the flowtube N 300 to the flowtube N+1 302 when the flowtube N 300 is configured to forward data and/or signals from the Subscriber(X) 360 to the Publisher (Y) 370.

In a manner similar to that described with reference to FIGS. 1 and 2, the flowtube N 300 may utilize the Reactive Stream protocols to cause data and/or signals sent on one of the RS 305, 315, 325, or 335 to be rerouted and then sent on any other of the RS 305, 315, 325, or 335 according to one or more conditions. The flowtube N 300 may utilize the Reactive Stream protocols to cause errors to flow between the RS 305, 315, 325, or 335 rather than be transmitted out of band. The flowtube N 300 may utilize the Reactive Stream protocols to cause data and/or errors to be injected into one of the RS 305, 315, 325, or 335 to flow in one direction or the other. For example, an error occurring in Subscriber(X) 360 may be rerouted by the flowtube N 300 through the Publisher(C) 330 to the ultimate Subscriber(D) 340. These errors may include errors notified to Subscriber (X) 360 from Publisher(W) 350 as well as other errors originating from within the flowtube N 300. Likewise, an error occurring in Subscriber(B) 320 may be rerouted by the flowtube N 300 through the Publisher(Y) 370 to the ultimate Subscriber(Z) 380. These errors may include errors notified to Subscriber(B) 320 from Publisher(A) 310 as well as other errors originating from within the flowtube N 300.

Figure 4:
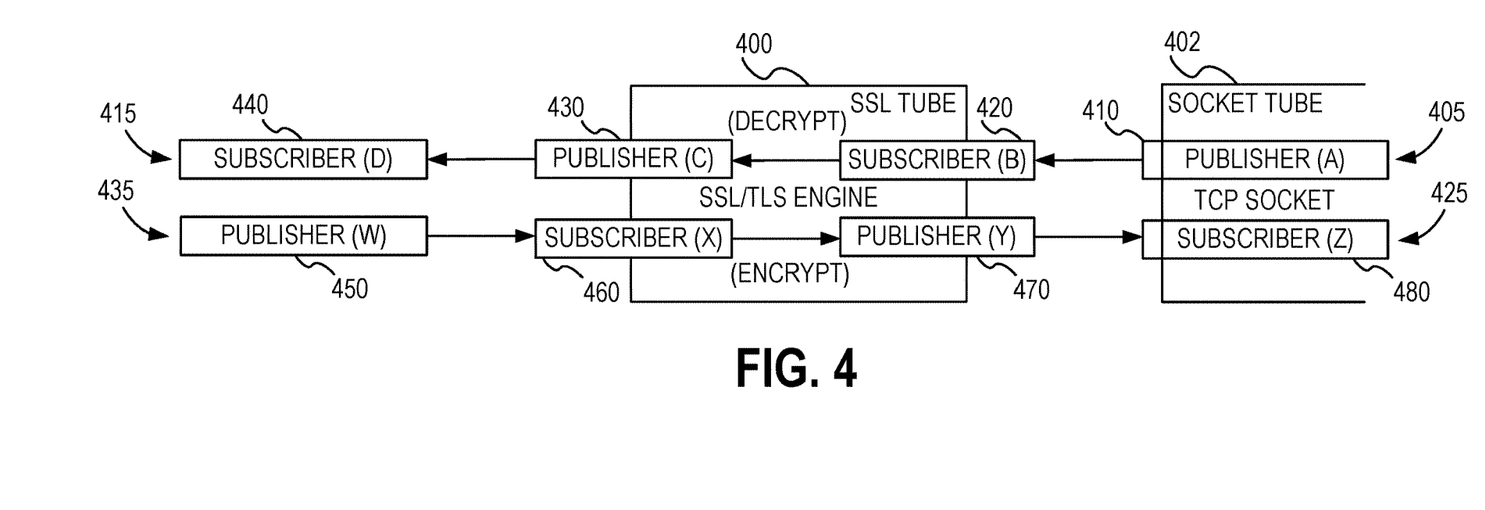
FIG. 4 is a block diagram that illustrates an SSL Tube that implements a secure socket layer/transport layer security (SSL/TLS) engine that tightly couples a pair of RS flows that are linked with a socket tube that implements a transfer control protocol (TCP) socket, in accordance with one or more embodiments.

FIG. 4 is a block diagram that illustrates an SSL Tube 400 that implements a secure socket layer/transport layer security (SSL/TLS) engine that tightly couples RS 405 and 425 that are linked with a socket tube 402 that implements a transfer control protocol (TCP) socket, in accordance with one or more embodiments. The socket tube 402 may be an embodiment of the flowtube N+1 302, and the SSL Tube 400 may be an embodiment of the flow tube 300 of FIG. 3, for example. Thus, the Publisher(A) 410 may be an embodiment of the Publisher(A) 310, the Subscriber(B) 420 may be an embodiment of the Subscriber(B) 320, the Publisher(C) 430 may be an embodiment of the Publisher(C) 330, the Subscriber(X) 460 may be an embodiment of the Subscriber(X) 360, the Publisher(Y) 470 may be an embodiment of the Publisher(Y) 370, and the Subscriber(Z) 480 may be an embodiment of the Subscriber(Z) 380. The side of the SSL Tube 400 not connected to the socket tube 402 may include a flow tube or other component that couples with the SSL Tube 400 via the RS 415 and 435.

The embodiment of FIG. 4 illustrates an example of using chains of flowtubes to provide additional processing of data that flows through the flowtubes from one side of the chain of flowtubes to the other. The socket tube 402 may transfer signals and data to the SSL Tube 400 using the TCP socket. In the embodiment of FIG. 4, data received by the SSL Tube 400 from the socket tube 402 via the Reactive Stream 405 may be encrypted. The SSL Tube 400 may therefore decrypt the data using an SSL/TLS engine included in the SSL Tube 400 before transmitting the decrypted data by the Publisher (C) 430 via the Reactive Stream 415 to the Subscriber(D) 440. Likewise, the SSL Tube 400 may encrypt data received by the Subscriber(X) 460 from the Publisher(W) 450 via the Reactive Stream 435 using the SSL/TLS engine included in the SSL Tube 400 before transmitting the encrypted data by the Publisher(Y) 470 via the Reactive Stream 425 to the Subscriber(Z) 480 of the Socket Tube 402. Other features of flowtubes, e.g., the error flow handling discussed with respect to the flowtubes 100, 200, and 300 of the embodiments of FIGS. 1-3, may also be applied to the SSL Tube 400 and/or the Socket Tube 402 in various embodiments.

Figure 5:
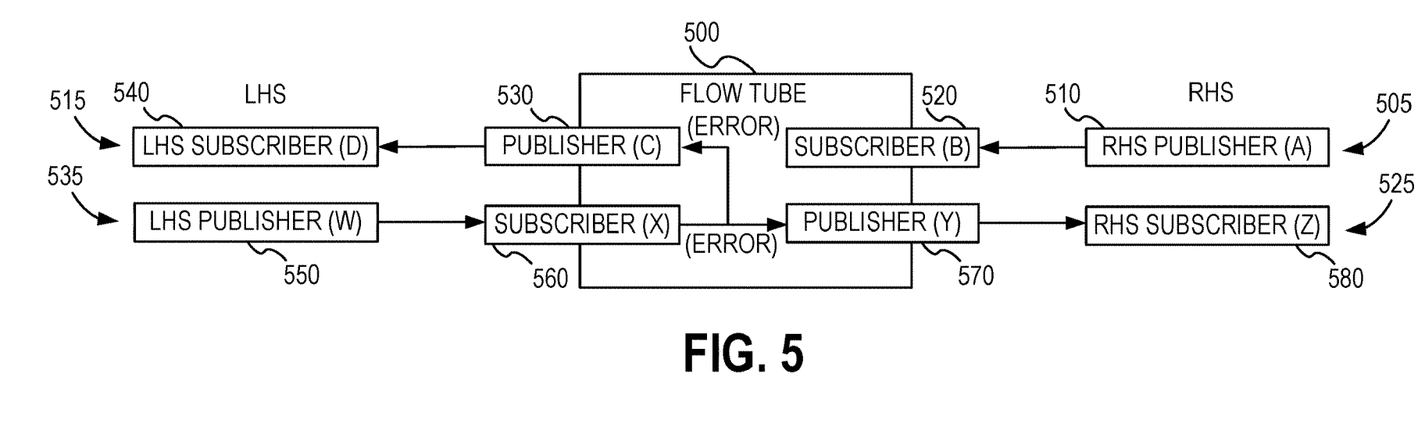
FIG. 5 is a block diagram that illustrates a two-sided flowtube for tightly coupling a set of RS flows, in accordance with one or more embodiments.

FIG. 5 is a block diagram that illustrates a two-sided flowtube 500 for tightly coupling a Reactive Stream 515, a Reactive Stream 535, and a Reactive Stream 525, in accordance with one or more embodiments. In an embodiment, the flowtube 500 provides a tightly coupled chain between a left-hand side (LHS) pair of RS 515 and 535 and a right-hand side (RHS) pair of RS 505 and 525.

The Reactive Stream 505 includes RHS Publisher(A) 510 source that may be part of a RHS component separate from and/or external to a component that includes the flowtube 500. The RHS Publisher(A) 510 is subscribed to by the Subscriber(B) 520 sink. The Subscriber(B) 520 is part of the component that includes the flowtube 500. Data and/or signals flow from the RHS Publisher(A) 510 to the Subscriber(B) 520 according to the RS protocol in the Reactive Stream 505.

The Reactive Stream 515 includes a Publisher(C) 530 source that is part of the component that includes the flowtube 500. The Publisher(C) 530 is subscribed to by the LHS Subscriber(D) 540 sink. The LHS Subscriber(D) 540 may be part of a LHS component separate from and/or external to the component that includes the flowtube 500. Data and/or signals flow from the Publisher(C) 530 to the LHS Subscriber(D) 540 according to the RS protocol in the Reactive Stream 515. The chain of RS 505 and 515 may provide a single uni-directional path through the flowtube 500 when the flowtube 500 is configured to forward data and/or signals from the Subscriber(B) 520 to the Publisher (C) 530.

The Reactive Stream 535 includes LHS Publisher(W) 550 source that may be part of a LHS component separate from and/or external to a component that includes the flowtube 500. The LHS Publisher(W) 550 is subscribed to by the Subscriber(X) 560 sink. The Subscriber(X) 560 is part of the component that includes the flowtube 500. Data and/or signals flow from the LHS Publisher(W) 550 to the Subscriber(X) 560 according to the RS protocol in the Reactive Stream 535.

The Reactive Stream 525 includes a Publisher(Y) 570 source that is part of the component that includes the flowtube 500. The Publisher(Y) 570 is subscribed to by the RHS Subscriber(Z) 580 sink. The RHS Subscriber(Z) 580 may be part of a RHS component separate from and/or external to the component that includes the flowtube 500. Data and/or signals flow from the Publisher(Y) 570 to the RHS Subscriber(Z) 580 according to the RS protocol in the Reactive Stream 525. The chain of RS 535 and 525 may provide a single uni-directional path through the flowtube 500 when the flowtube 500 is configured to forward data and/or signals from the Subscriber(X) 560 to the Publisher (Y) 570.

As illustrated in FIG. 5, the flowtube 500 utilizes the Reactive Stream protocols to cause errors occurring in Subscriber(X) 560 to be rerouted by the flowtube 500 through the Publisher(C) 530 to the ultimate LHS Subscriber (D) 540 via the Reactive Stream 515. These errors may include errors notified to Subscriber(X) 560 from LHS Publisher(W) 550 as well as other errors originating from within the flowtube 500. At the same time, the errors occurring in Subscriber(X) 560 are routed by the flowtube 500 through the Publisher(Y) 570 to the ultimate RHS Subscriber(Z) 580 via the Reactive Stream 525. In this way, the flowtube 500 of the embodiment illustrated in FIG. 5 facilitates error propagation in more than one direction using more than one Reactive Stream flow, e.g., both upstream and downstream flows for errors are provided simultaneously.

In various embodiments, the flowtube 500 may be configured to deliver errors to the LHS Subscriber(D) 540 originating from any source in the chain of Reactive Stream flows, regardless of where the errors originated. In various embodiments, the flowtube 500 may be configured to optionally propagate or not propagate the errors from the Subscriber(X) 560 to the Publisher(Y) 570 and the Reactive Stream 525. In various embodiments, the flowtube 500 may be configured to optionally propagate or not propagate the errors from the Subscriber(X) 560 to the Publisher(C) 530 and the Reactive Stream 515. The flowtube 500 may also be incorporated in a chain of flowtubes as illustrated in FIG. 3.

An example application of the flowtube 500 may include error handling for hypertext transfer protocol (HTTP) data. It may be desired to capture errors associated with HTTP data within the RS flows, rather than using separate callbacks to handle the errors. The flowtube 500 may publish an error associated with the HTTP data through a data message rather than through a traditional error message or callback routine. The flowtube 500 may be configured to capture and handle the errors associated with HTTP data within the RS flows that prior standard RS based communications systems could not.

Figure 6:
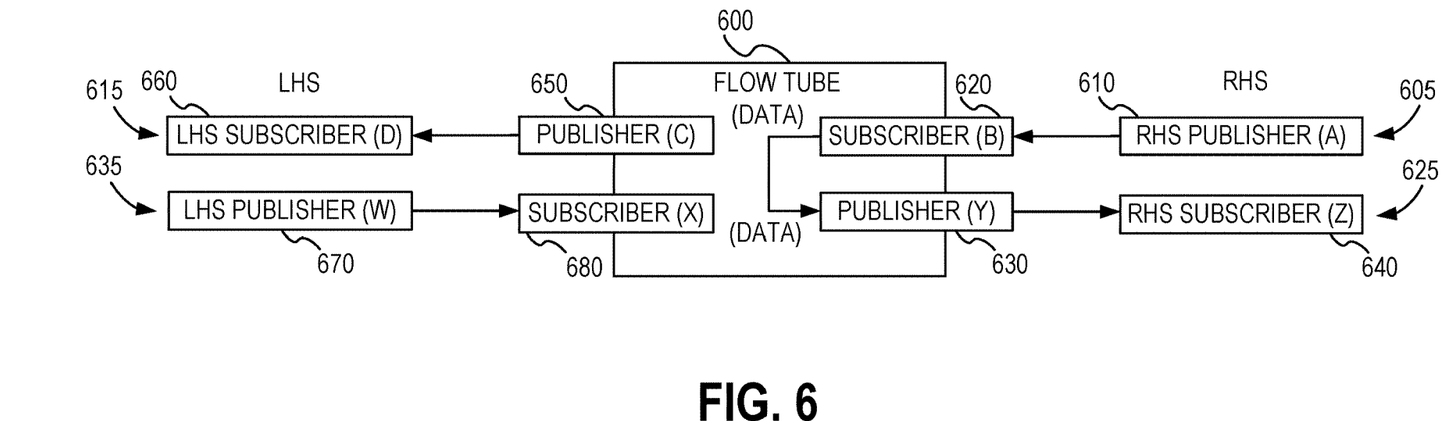
FIG. 6 is a block diagram that illustrates a two-sided flowtube for tightly coupling a pair of RS flows to intercept data, in accordance with one or more embodiments.

FIG. 6 is a block diagram that illustrates a two-sided flowtube 600 for tightly coupling a Reactive Stream 605 and a Reactive Stream 625 to intercept data, in accordance with one or more embodiments. The flowtube 600 is similar to the flowtube 200 of FIG. 2 except that rather than forwarding the data from the RHS Reactive Stream 205 to the LHS Reactive Stream 215, and from the LHS Reactive Stream 235 to the RHS Reactive Stream 225 as the flowtube 200 does, the flowtube 600 intercepts the data received by the Subscriber(B) 620 from the RHS Publisher(A) 610 via the Reactive Stream 605 and returns the data by transmitting the data by the Publisher(Y) 630 to the RHS Subscriber(Z) 640 via the Reactive Stream 625. In some embodiments, the flowtube 600 may modify the data prior to returning the data by transmitting the data to the RHS Subscriber(Z) 640. For example, the flowtube 600 may perform SSL/TLS encryption and decryption on the data. As a further example, the inbound data may include metadata for the SSL/TLS handshake, and a suitable handshake response may be sent by the flowtube 600 when returning the data to the RHS Subscriber (Z) 640. When a handshake is renegotiated, data transfer may be stalled. The flowtube 600 may stall publication of data during renegotiation of the handshake, and instead of publishing data during the renegotiation of the handshake, the flowtube 600 may publish some TLS metadata, e.g., the inbound metadata.

In various embodiments, the flowtube 600 may also inject data from an outside source, e.g., a datafile or an external data provider not illustrated in FIG. 6, and provide the injected data to be transmitted by the Publisher(Y) 630 to the RHS Subscriber(Z) 640.

The Publisher(C) 650 may be an embodiment of the Publisher(C) 230, the Subscriber(X) 680 may be an embodiment of the Subscriber(X) 260, the LHS Subscriber(D) 660 may be an embodiment of the LHS Subscriber(D) 240, the LHS Publisher(W) 670 may be an embodiment of the LHS Publisher(W) 250, the Reactive Stream 615 may be an embodiment of the Reactive Stream 215, and the Reactive Stream 635 may be an embodiment of the Reactive Stream 235. In the embodiment illustrated in FIG. 6, however, the flowtube 600 does not couple the RS 615 and 635 to the RS 605 and 625, respectively. This is in contrast to the embodiment illustrated in FIG. 2, in which the flowtube 200 does couple the RS 215 and 235 to the RS 205 and 225, respectively.

Figure 7:
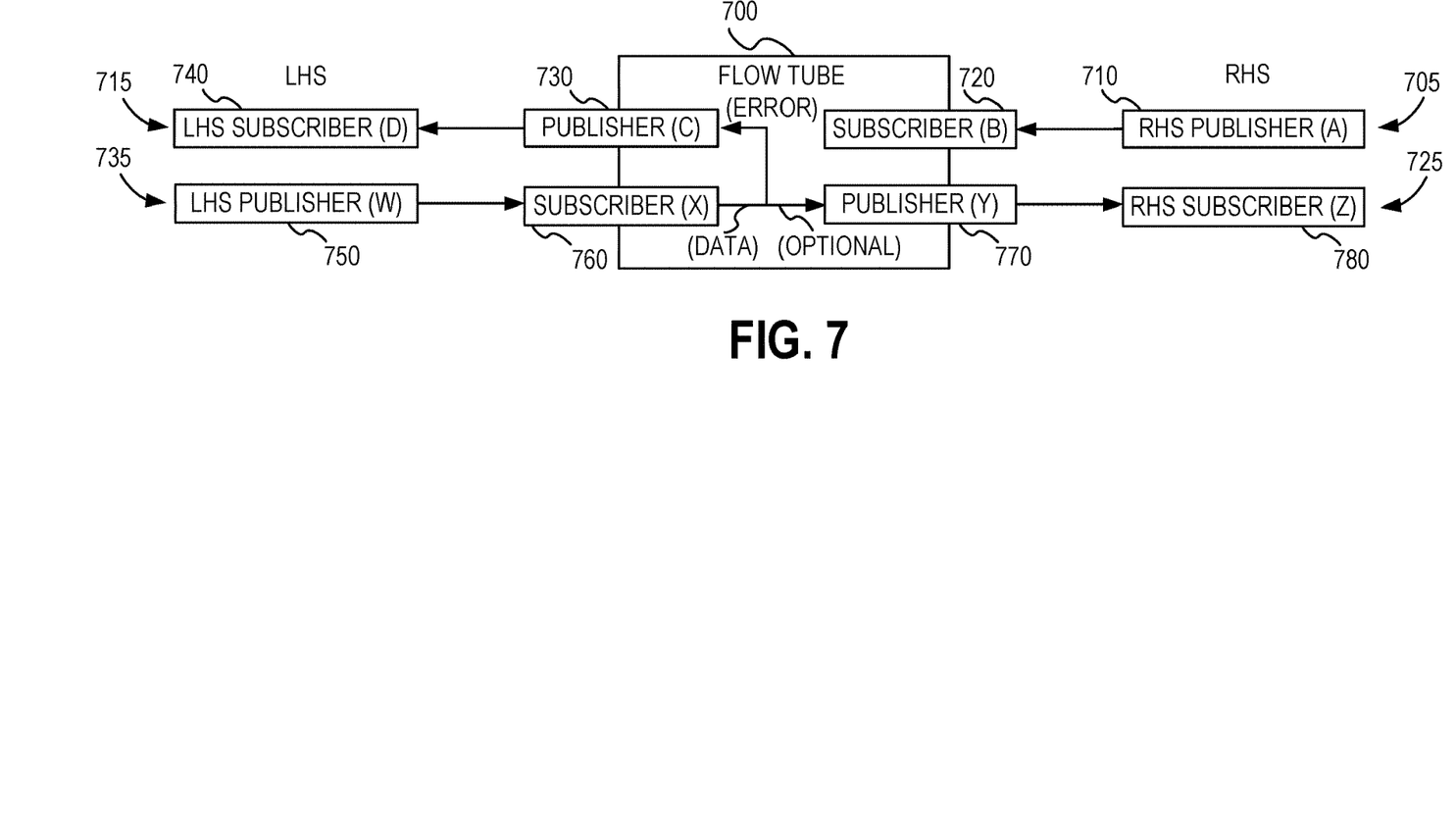
FIG. 7 is a block diagram that illustrates a two-sided flowtube for tightly coupling a set of RS flows, in accordance with one or more embodiments.

FIG. 7 is a block diagram that illustrates a two-sided flowtube 700 for tightly coupling a Reactive Stream 715, a Reactive Stream 735, and a Reactive Stream 725, in accordance with one or more embodiments. In an embodiment, the flowtube 700 provides a tightly coupled chain between a left-hand side (LHS) pair of RS 715 and 735 and a right-hand side (RHS) pair of RS 705 and 725.

The Reactive Stream 705 includes RHS Publisher(A) 710 source that may be part of a RHS component separate from and/or external to a component that includes the flowtube 700. The RHS Publisher(A) 710 is subscribed to by the Subscriber(B) 720 sink. The Subscriber(B) 720 is part of the component that includes the flowtube 700. Data and/or signals flow from the RHS Publisher(A) 710 to the Subscriber(B) 720 according to the RS protocol in the Reactive Stream 705.

The Reactive Stream 715 includes a Publisher(C) 730 source that is part of the component that includes the flowtube 700. The Publisher(C) 730 is subscribed to by the LHS Subscriber(D) 740 sink. The LHS Subscriber(D) 740 may be part of a LHS component separate from and/or external to the component that includes the flowtube 700. Data and/or signals flow from the Publisher(C) 730 to the LHS Subscriber(D) 740 according to the RS protocol in the Reactive Stream 715. The chain of RS 705 and 715 may provide a single uni-directional path through the flowtube 700 when the flowtube 700 is configured to forward data and/or signals from the Subscriber(B) 720 to the Publisher (C) 730.

The Reactive Stream 735 includes LHS Publisher(W) 750 source that may be part of a LHS component separate from and/or external to a component that includes the flowtube 700. The LHS Publisher(W) 750 is subscribed to by the Subscriber(X) 760 sink. The Subscriber(X) 760 is part of the component that includes the flowtube 700. Data and/or signals flow from the LHS Publisher(W) 750 to the Subscriber(X) 760 according to the RS protocol in the Reactive Stream 735.

The Reactive Stream 725 includes a Publisher(Y) 770 source that is part of the component that includes the flowtube 700. The Publisher(Y) 770 is subscribed to by the RHS Subscriber(Z) 780 sink. The RHS Subscriber(Z) 780 may be part of a RHS component separate from and/or external to the component that includes the flowtube 700. Data and/or signals flow from the Publisher(Y) 770 to the RHS Subscriber(Z) 780 according to the RS protocol in the Reactive Stream 725. The chain of RS 735 and 725 may provide a single uni-directional path through the flowtube 700 when the flowtube 700 is configured to forward data and/or signals from the Subscriber(X) 760 to the Publisher (Y) 770.

As illustrated in FIG. 7, the flowtube 700 utilizes the Reactive Stream protocols to transform inbound data received by Subscriber(X) 760 from LHS Publisher(W) 750 into an error and reroute the error to be transmitted by Publisher(C) 730 to LHS Subscriber(D) 740 via the Reactive Stream 715. These errors may include errors notified to Subscriber(X) 760 from LHS Publisher(W) 750 as well as other errors originating from within the flowtube 700. At the same time, the errors occurring in Subscriber(X) 760 or other messages or notifications may optionally be routed by the flowtube 700 through the Publisher(Y) 770 to the ultimate RHS Subscriber(Z) 780 via the Reactive Stream 725. In some embodiment, no errors, messages, or notifications may be routed to the RHS Subscriber(Z) 780 when errors are routed to the LHS Subscriber(D) 740. The flowtube 700 of the embodiment illustrated in FIG. 7 may facilitate error propagation in more than one direction using more than one Reactive Stream flow, e.g., both upstream and downstream flows for errors may be provided simultaneously.

As an example, an embodiment of the flowtube 700 may be configured to perform SSL/TLS encryption and decryption on the data. When an SSL/TLS handshake fails, or an internal SSL/TLS Engine of the flowtube 700 embodiment fails, the data associated with the SSL/TLS handshake or intended result of the encryption/decryption may be converted to an appropriate error message and routed according to the entity waiting for an acknowledgment that the intended recipient received the data.

In various embodiments, the flowtube 700 may be configured to deliver errors to the LHS Subscriber(D) 740 originating from any source in the chain of Reactive Stream flows, regardless of where the errors originated. In various embodiments, the flowtube 700 may be configured to optionally propagate or not propagate the errors from the Subscriber(X) 760 to the Publisher(Y) 770 and the Reactive Stream 725. In various embodiments, the flowtube 700 may be configured to optionally propagate or not propagate the errors from the Subscriber(X) 760 to the Publisher(C) 730 and the Reactive Stream 715. The flowtube 700 may also be incorporated in a chain of flowtubes as illustrated in FIG. 3.

Examples of operations performed by the flowtubes are given below with reference to FIGS. 1-7.

3. Example Operations Using Flowtubes

Figure 8:
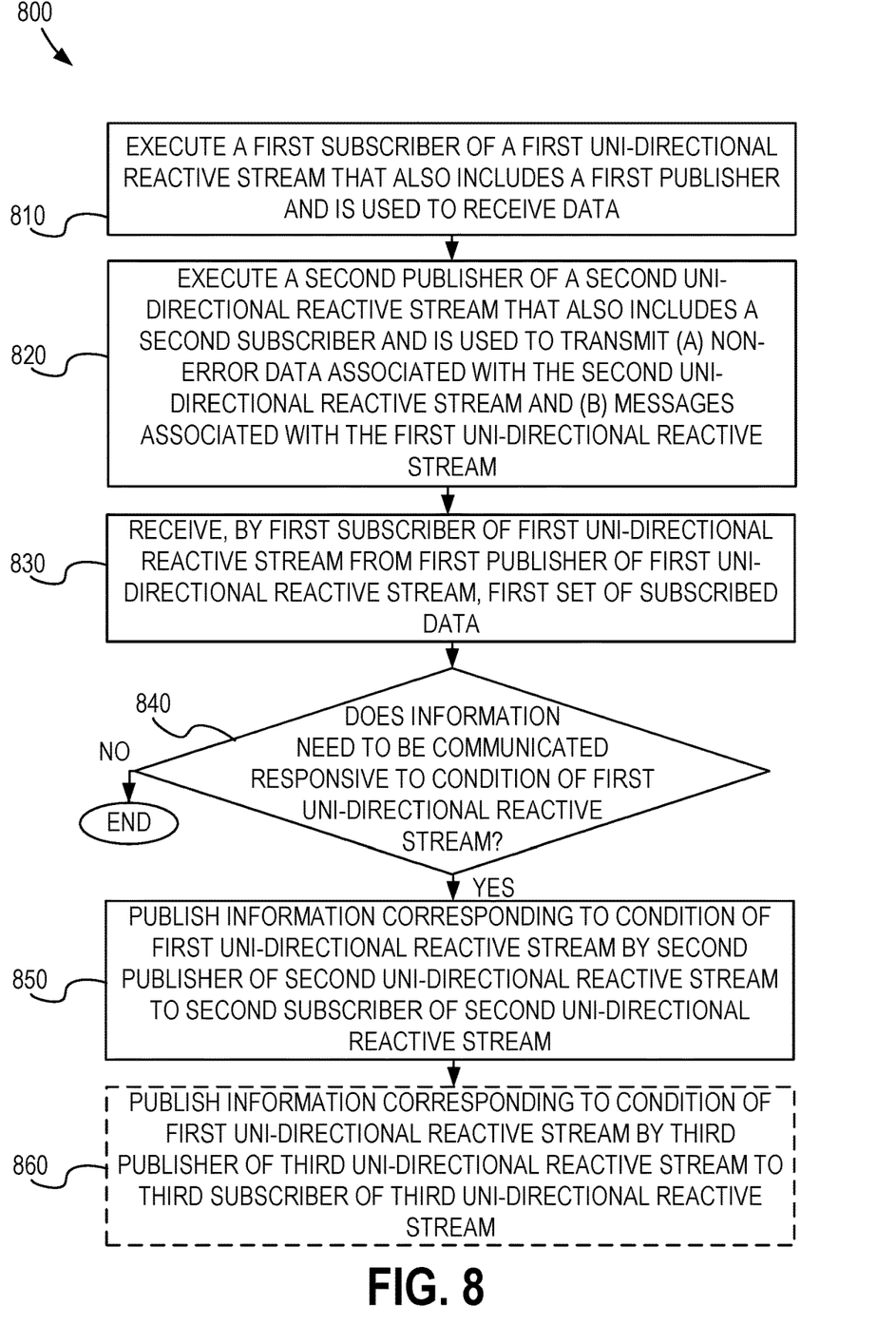
FIG. 8 is a flow chart that illustrates a method of performing bi-directional asynchronous communications based upon a pair of tightly coupled RS flows, in accordance with one or more embodiments.

FIG. 8 is a flow chart that illustrates a method 800 of performing bi-directional asynchronous communications based upon a pair of tightly coupled RS flows, in accordance with one or more embodiments. One or more operations illustrated in FIG. 8 may be modified, rearranged, or omitted all together. Accordingly, the particular sequence of operations illustrated in FIG. 8 should not be construed as limiting the scope of one or more embodiments. A detailed example is described below for purposes of clarity. Components and/or operations described below should be understood as one specific example which may not be applicable to certain embodiments. Accordingly, components and/or operations described below should not be construed as limiting the scope of any of the claims. In various embodiments, the method 800 may be performed using the systems and components described above with reference to FIGS. 1-7.

In an operation 810, a first component that includes a flowtube (e.g., a computing processor that includes flowtube 500 or flowtube 700) may execute a first subscriber (e.g., Subscriber(X) 560 or 760) of a first uni-directional Reactive Stream (e.g., Reactive Stream 535 or 735) that also includes a first publisher (e.g., LHS Publisher(W) 550 or 750) and is used to receive data. The data received by the first subscriber may be received from a second component external to the first component that includes the flowtube.

In an operation 820, the first component may execute a second publisher (e.g., Publisher(C) 530 or 730) of a second uni-directional Reactive Stream (e.g., Reactive Stream 515 or 715) that also includes a second subscriber (e.g., LHS Subscriber(D) 540 or 740). The second publisher may be used to transmit at least non-error data associated with the second uni-directional Reactive Stream and messages associated with the first uni-directional Reactive Stream.

In an operation 830, the first subscriber (e.g., Subscriber(X) 560 or 760) of the first uni-directional Reactive Stream (e.g., Reactive Stream 535 or 735) may receive a first set of subscribed data from the first publisher (e.g., LHS Publisher(W) 550 or 750) of the first uni-directional Reactive Stream. The computing processor of the first component that includes the flowtube (e.g., flowtube 500 or 700) associated with the first subscriber may process the signals and data received from the first publisher according to the RS protocols.

In an operation 840, the first component may determine if there is a need to communicate information responsive to a condition of the first uni-directional Reactive Stream (e.g., Reactive Stream 535 or 735) back to the second component even though the first uni-directional Reactive Stream is directed from the first publisher (e.g., LHS Publisher(W) 550 or 750) to the first subscriber (e.g., Subscriber(X) 560 or 760). The first component may make the determination using a computing processor that includes flowtube 500 or flowtube 700. The determination of the need may include detecting an error in processing the first set of subscribed data by the computing processor of the flowtube associated with the first component.

In an operation 850, responsive to a positive determination in operation 840, the first component may cause the second publisher (e.g., Publisher(C) 530 or 730) to publish the information corresponding to the condition of the first uni-directional Reactive Stream (e.g., Reactive Stream 535 or 735) to the second subscriber (e.g., LHS Subscriber(D) 540 or 740) of the second uni-directional Reactive Stream (e.g., Reactive Stream 515 or 715). The first subscriber may subsequently receive, from the first publisher, an acknowledgment of receipt of the information by the second subscriber of the second component.

In an optional operation 860, the first component may cause a third publisher (e.g., Publisher(Y) 570 or 770) to publish the information corresponding to the condition of the first uni-directional Reactive Stream (e.g., Reactive Stream 535 or 735) to a third subscriber (e.g., RHS Subscriber(Z) 580 or 780) of a third uni-directional Reactive Stream (e.g., Reactive Stream 525 or 725). In the event that the third subscriber cancels the subscription and a fourth subscriber subscribes to the third publisher in place of the third subscriber, the third publisher may publish the information to the fourth subscriber instead.

Figure 9:
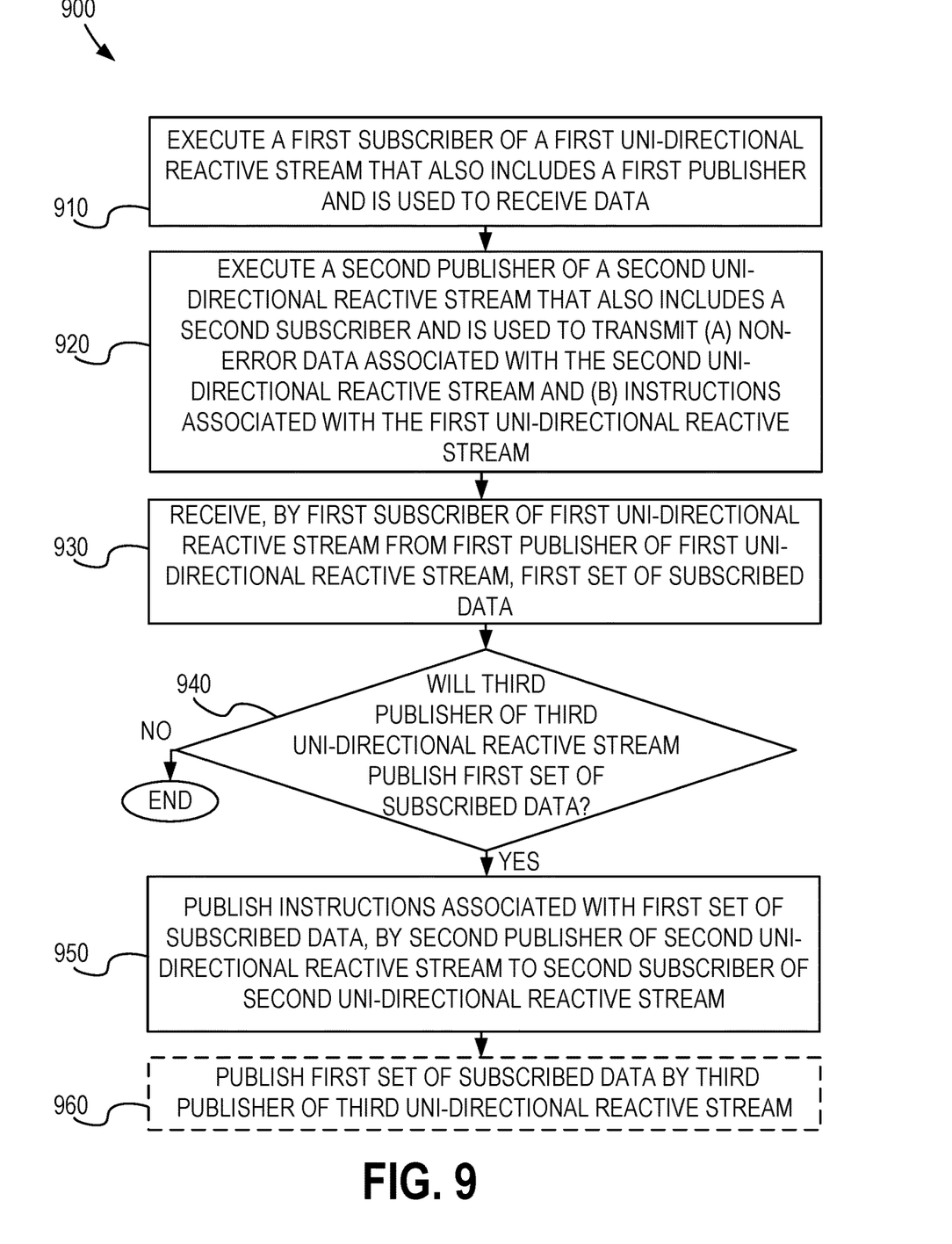
FIG. 9 is a flow chart that illustrates a method of performing bi-directional asynchronous communications based upon a pair of tightly coupled RS flows, in accordance with one or more embodiments.

FIG. 9 is a flow chart that illustrates a method 900 of performing bi-directional asynchronous communications based upon a pair of tightly coupled RS flows, in accordance with one or more embodiments. One or more operations illustrated in FIG. 9 may be modified, rearranged, or omitted all together. Accordingly, the particular sequence of operations illustrated in FIG. 9 should not be construed as limiting the scope of one or more embodiments. A detailed example is described below for purposes of clarity. Components and/or operations described below should be understood as one specific example which may not be applicable to certain embodiments. Accordingly, components and/or operations described below should not be construed as limiting the scope of any of the claims. In various embodiments, the method 900 may be performed using the systems and components described above with reference to FIGS. 1-7. In various embodiments, the operations described below may be combined with operations described in relation to the method 800.

In an operation 910, a first component that includes a flowtube (e.g., a computing processor that includes flowtube 700) may execute a first subscriber (e.g., Subscriber(X) 760) of a first uni-directional Reactive Stream (e.g., Reactive Stream 735) that also includes a first publisher (e.g., LHS Publisher(W) 750) and is used to receive data. The data received by the first subscriber may be received from a second component external to the first component that includes the flowtube.

In an operation 920, the first component may execute a second publisher (e.g., Publisher(C) 730) of a second uni-directional Reactive Stream (e.g., Reactive Stream 715) that also includes a second subscriber (e.g., LHS Subscriber(D) 740). The second publisher may be used to transmit at least non-error data associated with the second uni-directional Reactive Stream and messages associated with the first uni-directional Reactive Stream.

In an operation 930, the first subscriber (e.g., Subscriber (X) 760) of the first uni-directional Reactive Stream (e.g., Reactive Stream 735) may receive a first set of subscribed data from the first publisher (e.g., LHS Publisher(W) 750) of the first uni-directional Reactive Stream. The computing processor of the first component that includes the flowtube (e.g., flowtube 700) associated with the first subscriber may process the signals and data received from the first publisher according to the RS protocols.

In an operation 940, the first component may determine if a third publisher (e.g., the Publisher(Y) 770) of a third Reactive Stream (e.g., Reactive Stream 725), will also publish the first set of subscribed data to a third subscriber of a third component (e.g., RHS Subscriber(Z) 780).

In an operation 950, responsive to a positive determination in operation 940, the first component may cause the second publisher (e.g., Publisher(C) 730) to publish the instructions associated with the first set of subscribed data received via the first uni-directional Reactive Stream (e.g., Reactive Stream 735) to the second subscriber (e.g., LHS Subscriber(D) 740) of the second uni-directional Reactive Stream (e.g., Reactive Stream 715). The first subscriber may subsequently receive, from the first publisher, an acknowledgment of receipt of the information by the second subscriber of the second component.

In an operation 960, the third publisher (e.g., the Publisher (Y) 770) of the third Reactive Stream (e.g., Reactive Stream 725), may also publish the first set of subscribed data to the third subscriber of the third component (e.g., RHS Subscriber(Z) 780).

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
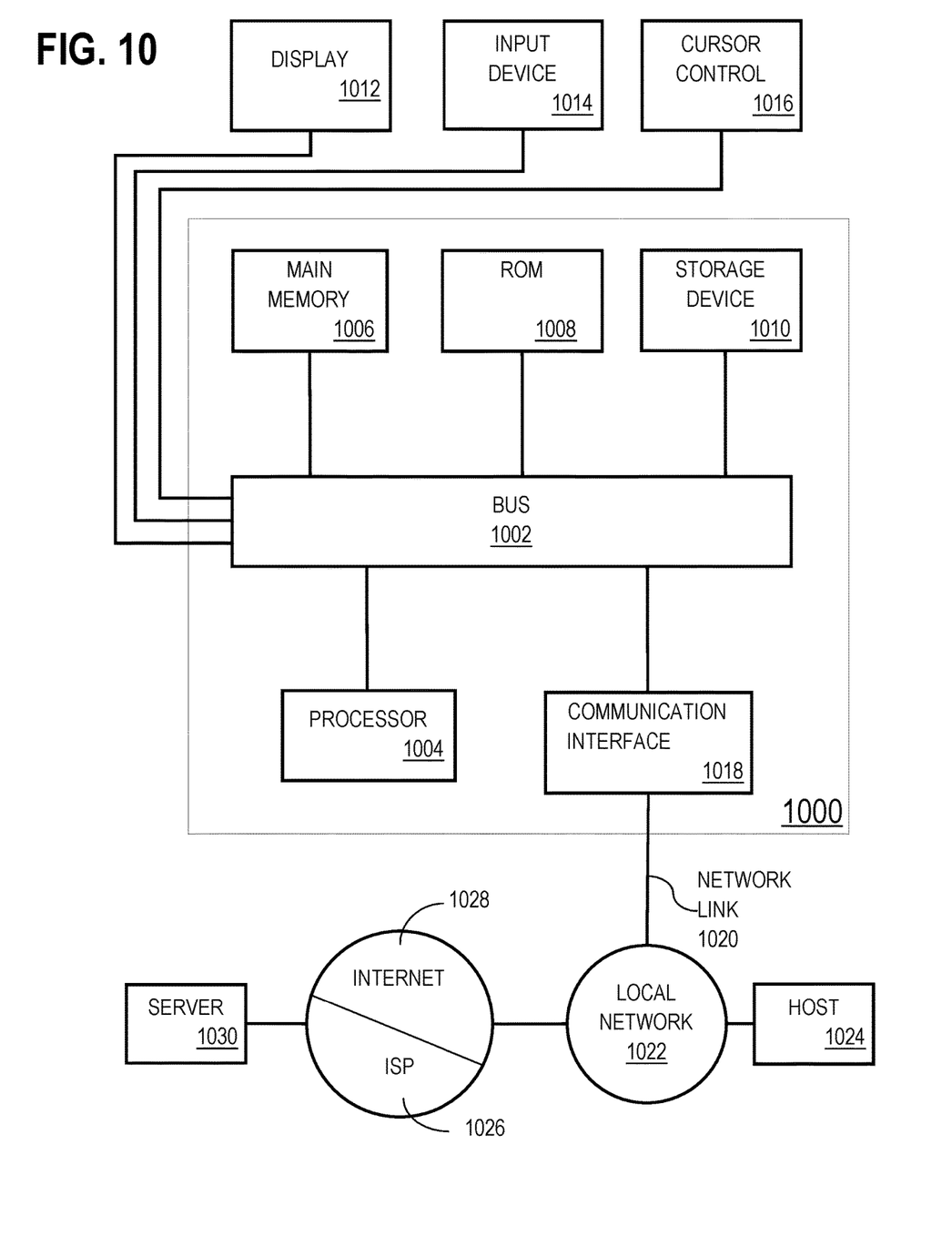
FIG. 10 is a block diagram that illustrates a computer system, in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into the remote computer's dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as the code is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   executing, by a first component, a first subscriber of a first uni-directional reactive stream;
      wherein the first uni-directional reactive stream comprises the first subscriber and a first publisher;
      wherein the first uni-directional reactive stream is being used to receive data by the first component from a second component;
   executing, by the first component, a second publisher of a second uni-directional reactive stream;
      wherein the second uni-directional reactive stream comprises the second publisher and a second subscriber;
      wherein the second uni-directional reactive stream is being used to transmit at least (a) non-error data associated with the second uni-directional reactive stream by the first component to the second component and (b) messages associated with the first uni-directional reactive stream;
   receiving, by the first subscriber of the first uni-directional reactive stream from the first publisher of the first uni-directional reactive stream, a first set of subscribed data;
   determining, by the first component, a need to communicate information responsive to a condition of the first uni-directional reactive stream back to the second component even though the first uni-directional reactive stream is directed from the first publisher to the first subscriber;
   responsive to the determining operation: publishing, the information corresponding to the condition of the first uni-directional reactive stream, by the second publisher of the second uni-directional reactive stream to the second subscriber of the second uni-directional reactive stream.

2. The medium of claim 1, wherein determining the need comprises detecting, by the first component, an error in processing the first set of subscribed data.

3. The medium of claim 1, wherein the operations further comprise:
publishing, by a third publisher executed by the first component, the information to a third subscriber executed by a third component downstream from the first component.

4. The medium of claim 1, wherein the operations further comprise:
receiving, by the first subscriber, acknowledgement of the receipt of the information by the second component.

5. The medium of claim 1, wherein the second subscriber subscribes to the second publisher before the first subscriber subscribes to the first publisher.

6. The medium of claim 1, wherein the operations further comprise:
publishing, by a third publisher executed by the first component, the information to a fourth subscriber executed by a fourth component downstream from the first component after a third subscriber executed by a third component downstream from the first component already subscribed to the third publisher cancels a subscription to the third publisher.

7. A non-transitory computer readable medium comprising instructions which, when executed by one or more hardware processors, causes performance of operations comprising:
executing, by a first component, a first subscriber of a first uni-directional reactive stream;
wherein the first uni-directional reactive stream comprises the first subscriber and a first publisher;
wherein the first uni-directional reactive stream is being used to receive data by the first component from a second component;
executing, by the first component, a second publisher of a second uni-directional reactive stream;
wherein the second uni-directional reactive stream comprises the second publisher and a second subscriber;
wherein the second uni-directional reactive stream is being used to transmit at least (a) non-error data associated with the second uni-directional reactive stream by the first component to the second component and (b) instructions associated with the first uni-directional reactive stream;
receiving, by the first subscriber of the first uni-directional reactive stream from the first publisher of the first uni-directional reactive stream, a first set of subscribed data; and
prior to publishing, by a third publisher of a third uni-directional reactive stream, the first set of subscribed data: publishing, instructions associated with the first set of subscribed data, by the second publisher of the second uni-directional reactive stream to the second subscriber of the second uni-directional reactive stream.

8. The medium of claim 7, wherein the operations further comprise publishing, by the third publisher of the third uni-directional reactive stream, the first set of subscribed data subsequent to publishing, instructions associated with the first set of subscribed data, by the second publisher of the second uni-directional reactive stream to the second subscriber of the second uni-directional reactive stream.

9. The medium of claim 7, wherein the operations further comprise:
determining, by the first component, a need to communicate information responsive to a condition of the first uni-directional reactive stream back to the second component even though the first uni-directional reactive stream is directed from the first publisher to the first subscriber; and
responsive to the determining operation: publishing, the information corresponding to the condition of the first uni-directional reactive stream, by the second publisher of the second uni-directional reactive stream to the second subscriber of the second uni-directional reactive stream.

10. The medium of claim 9, wherein determining the need comprises detecting, by the first component, an error in processing the first set of subscribed data.

11. The medium of claim 7, wherein the operations further comprise:
receiving, by the first subscriber, acknowledgement of the receipt of the information by the second component.

12. The medium of claim 7, wherein the second subscriber subscribes to the second publisher before the first subscriber subscribes to the first publisher.

13. The medium of claim 7, wherein the operations further comprise:
publishing, by a third publisher executed by the first component, the information to a fourth subscriber executed by a fourth component downstream from the first component after a third subscriber executed by a third component downstream from the first component already subscribed to the third publisher cancels a subscription to the third publisher.

14. A method of performing bi-directional asynchronous communications based upon a pair of tightly coupled RS flows, comprising:
executing, by a first component, a first subscriber of a first uni-directional reactive stream;
wherein the first uni-directional reactive stream comprises the first subscriber and a first publisher;
wherein the first uni-directional reactive stream is being used to receive data by the first component from a second component;
executing, by the first component, a second publisher of a second uni-directional reactive stream;
wherein the second uni-directional reactive stream comprises the second publisher and a second subscriber;
wherein the second uni-directional reactive stream is being used to transmit at least (a) non-error data associated with the second uni-directional reactive stream by the first component to the second component and (b) messages associated with the first uni-directional reactive stream;
receiving, by the first subscriber of the first uni-directional reactive stream from the first publisher of the first uni-directional reactive stream, a first set of subscribed data;
determining, by the first component, a need to communicate information responsive to a condition of the first uni-directional reactive stream back to the second component even though the first uni-directional reactive stream is directed from the first publisher to the first subscriber; and
responsive to the determining operation: publishing, the information corresponding to the condition of the first uni-directional reactive stream, by the second publisher of the second uni-directional reactive stream to the second subscriber of the second uni-directional reactive stream;

wherein the first component and the second component each include computing devices operative to digitally communicate information.

15. The method of claim 14, wherein determining the need comprises detecting, by the first component, an error in processing the first set of subscribed data.

16. The method of claim 14, further comprising:
publishing, by a third publisher executed by the first component, the information to a third subscriber executed by a third component downstream from the first component.

17. The method of claim 14, further comprising:
publishing, by a third publisher executed by the first component, the information to a fourth subscriber executed by a fourth component downstream from the first component after a third subscriber executed by a third component downstream from the first component already subscribed to the third publisher cancels a subscription to the third publisher.

18. A method of performing bi-directional asynchronous communications based upon a pair of tightly coupled RS flows, comprising:
executing, by a first component, a first subscriber of a first uni-directional reactive stream;
wherein the first uni-directional reactive stream comprises the first subscriber and a first publisher;
wherein the first uni-directional reactive stream is being used to receive data by the first component from a second component;
executing, by the first component, a second publisher of a second uni-directional reactive stream;
wherein the second uni-directional reactive stream comprises the second publisher and a second subscriber;
wherein the second uni-directional reactive stream is being used to transmit at least (a) non-error data associated with the second uni-directional reactive stream by the first component to the second component and (b) instructions associated with the first uni-directional reactive stream;
receiving, by the first subscriber of the first uni-directional reactive stream from the first publisher of the first uni-directional reactive stream, a first set of subscribed data; and
prior to publishing, by a third publisher of a third uni-directional reactive stream, the first set of subscribed data: publishing, instructions associated with the first set of subscribed data, by the second publisher of the second uni-directional reactive stream to the second subscriber of the second uni-directional reactive stream;
wherein the first component and the second component each include computing devices operative to digitally communicate information.

19. The method of claim 18, further comprising publishing, by the third publisher of the third uni-directional reactive stream, the first set of subscribed data subsequent to publishing, instructions associated with the first set of subscribed data, by the second publisher of the second uni-directional reactive stream to the second subscriber of the second uni-directional reactive stream.

20. The method of claim 18, further comprising:
determining, by the first component, a need to communicate information responsive to a condition of the first uni-directional reactive stream back to the second component even though the first uni-directional reactive stream is directed from the first publisher to the first subscriber; and
responsive to the determining operation: publishing, the information corresponding to the condition of the first uni-directional reactive stream, by the second publisher of the second uni-directional reactive stream to the second subscriber of the second uni-directional reactive stream.

* * * * *